United States Patent
Grasso et al.

(10) Patent No.: US 6,873,430 B2
(45) Date of Patent: Mar. 29, 2005

(54) KNOWLEDGE MANAGEMENT SYSTEM AND METHOD

(75) Inventors: Antonietta Grasso, Grenoble (FR); Jean-Luc Meunier, Saint Nazaire les Eymes (FR); Christopher Thompson, Grenoble (FR)

(73) Assignee: Xerox Corporation, Stamford, CT (US)

( * ) Notice: Subject to any disclaimer, the term of this patent is extended or adjusted under 35 U.S.C. 154(b) by 994 days.

(21) Appl. No.: 09/746,913

(22) Filed: Dec. 22, 2000

(65) Prior Publication Data

US 2002/0080387 A1 Jun. 27, 2002

(51) Int. Cl.[7] .......................... G06K 15/00; G06K 9/64
(52) U.S. Cl. ................... 358/1.16; 358/1.17; 358/1.18; 382/217; 715/505; 715/506; 715/908
(58) Field of Search .................. 358/1.16, 1.17, 358/1.18; 382/209, 217; 715/505, 506, 908, 507, 508, 522

(56) References Cited

U.S. PATENT DOCUMENTS 5,682,540 A    10/1997  Klotz, J. et al. ............ 395/766
6,141,111 A  * 10/2000  Kato ........................ 358/1.15
6,473,203 B1 * 10/2002  Hisatomi et al. ........... 358/403
6,785,721 B1 *  8/2004  Immerman et al. ......... 709/220
2001/0000027 A1 * 3/2001  Collard et al. ............. 399/398

FOREIGN PATENT DOCUMENTS

JP          09149230     *  6/1997    ............ H04N/1/32

OTHER PUBLICATIONS

U.S. patent appl. No. 09/596,070, filed Jun. 12, 2000, Glance.

U.S. patent appl. No. 09/305,836, filed May 5, 1999, Grefenstette, et al.

* cited by examiner

Primary Examiner—Jerome Grant, II
(74) Attorney, Agent, or Firm—Jeannette M Walder (57) ABSTRACT

A knowledge management system according to the invention uses print cover sheets to connect users to knowledge relevant both to the user and the communities to which they belong by making use of the declaration of relevance implicit in the print process. The cover sheet becomes an input, output and surrogate document mechanism enabling access to both document repositories and associated knowledge management services, such as for example, document related services and a recommender service.

23 Claims, 3 Drawing Sheets

KNOWLEDGE MANAGEMENT SYSTEM AND METHOD

CROSS REFERENCE TO RELATED APPLICATIONS

This application is related to copending, coassigned U.S. patent application, Grasso et al., "Recommender System and Method for Generating Implicit Ratings," U.S. Ser. No. 09/746,917, filed the same day as this application, and copending, coassigned U.S. patent application, Snowdon et al., "Electronic Board System," U.S. Ser. No. 09/746,914 filed the same day as this application.

FIELD OF THE INVENTION

This invention relates to knowledge management systems and more particularly to a knowledge management system employing a paper user interface to provide document related services and recommender services.

BACKGROUND OF THE INVENTION

The goal of knowledge management systems is to provide users with greater access and more efficient management of the information contained within the system. The advent of electronic media was seen as a boon to information management systems. With the increasing use of electronic media, the demise of paper as a communication medium seemed plausible. However, the promise of the "paperless" office has not yet come to pass. It is still true, for example, that almost all important documents are printed at least once during their life, because paper is still the most convenient medium for reading, annotating and sharing documents. The combination printer/facsimile/copier room of a work group is a crossroads through which passes much of the relevant information embodied in documents. Indeed, many knowledge management systems have been focusing on ways to use both paper and electronic media.

Paper UI (paper user interface) systems, for example, rely on paper to provide a major interface for users to an electronic information system or device. In a Paper UI system a user accesses the system (or device) by using a cover sheet, i.e., a piece of paper (or hardcopy medium) with machine readable code. The machine readable code provides instructions, data and other information to the electronic information system. Typically, the hardcopy media is scanned, the machine readable code decoded and any resulting instructions executed into the system. For example, U.S. Pat. No. 5,682,540, Klotz, Jr. et al., System for Representing Electronic Files Using a Paper Medium, describes the use of paper forms with machine readable and human readable information as document surrogates or tokens for electronic files. An example of a Paper UI system is the Xerox FlowPort™ system which employs paper forms called PaperWare® forms which enable users to scan, store, email, Internet fax and remotely print electronic documents.

Despite the availability of electronic information and the convenience of paper to access the information, within a workgroup, employees often rely on social interaction and happenstance to discover relevant new documents and share other kinds of information. Without face-to-face interactions, a person finding a relevant document might not otherwise be aware of a colleague's interest, or might not see the link between a particular piece of information and what he or she perceives as being the colleague's set of interests.

Recommender systems, in particular collaborative recommender systems, can be part of the solution. They help augment the sharing of relevant information and allow users to declare their interests. However, until recently, workplace recommender systems have required active participation from users to provide explicit ratings. For example, in Knowledge Pump (see N. Glance, D. Arregui, M. Dardenne: "Knowledge Pump: Supporting the Flow and Use of Knowledge in Networked Organizations", U. Borghoff, R. Pareschi (eds.), Information Technology for Knowledge Management, Springer Verlag, Berlin, 1998 and N. Glance, D. Arregui, M. Dardenne. "Making Recommender Systems Work for Organizations", *Proceedings of PAAM'99*, 1999), users are expected to identify documents of potential interest to others, classify them, rate them, and optionally provide comments.

The use of implicit ratings (ratings deduced from behavior) to compute recommendations has been proposed in the literature (see D. M. Nichols, "Implicit Rating and Filtering", in Proceedings of the $5^{th}$ DELOS Workshop on Filtering and Collaborative Filtering, November 1997, Budapest, Hungary for a review of proposals). However most of these efforts have been limited to collecting user bookmarking and reading actions. Copending, coassigned U.S. patent application Ser. No. 09/596,070 filed Jun. 12, 2000, "Recommender System and Method for Generating Implicit Ratings Based on User Interactions with Handheld Devices," uses implicit ratings generated from monitoring user interaction with devices such as MP3 players or ebook readers. Copending, coassigned U.S. patent application Ser. No. 09/305,836 filed May 5, 1999, "Finding Groups of People Based on Linguistically Analyzable Content of Resources Accessed" passively captures an organization-related view of the web via conceptual indexing of the pages browsed by workers who declare themselves in "work mode."

In a work group where the printer (or multi-function device) is shared, individual user's documents are separated from one another in the output bin by means of "cover sheets." A cover sheet (in this application as opposed to a cover sheet in a Paper UI system) is the first output sheet from the printer and typically includes information such as the requesting user's work group name, the printed document's title and a date/time stamp. Such cover sheets are mainly discarded in the recycle bin located in most work group rooms. No record of which documents have been printed and by which users is retained except, perhaps, for the print logs generated at the printer server used for administrative or accounting purposes.

Printer output cover sheets have been considered as information tools. For example, the Palo Alto Research Center CoverUp project adds a different news article, puzzle, cartoon, etc. to the cover sheet of each job a user prints. Users can select content to be printed on their cover sheets from a group of different subjects, such as cartoons, stock quotes, crossword puzzles. Another Xerox project, the Printertainment project, has been investigating use of the printer output cover sheet as a leisure-related, customized cover sheet which is used as a Paper UI input device. The printer output cover sheet would include user customizable entertainment preferences, which can then be used as an input cover sheet to enable the selected entertainment preferences.

A knowledge management system which enables access both to document repositories and associated knowledge management services, including a recommender service, would provide users greater access to information in the system. Recommender systems which capture implicit ratings generally provide the benefit of obtaining a greater number of ratings than those systems requiring active participation. A knowledge management system employing a recommender system which generates implicit ratings in a work group environment and employs a paper user interface would provide even greater benefits.

SUMMARY OF THE INVENTION

A knowledge management system, according to the invention, includes a knowledge management service for providing services associated with items in the system, a repository for storing electronic versions of items in the system and a device, responsive to a user request, for recording a requested item on a hardcopy medium. For each item requested to be recorded the device generates a cover sheet, which is a hardcopy medium having human readable marks identifying the requesting user, the item recorded and the knowledge management service associated with the requested item. For each item requested to be recorded, the knowledge management service stores a record of the user request with an electronic version of the requested item in the repository. A new cover sheet is dynamically generated each time an item is printed or faxed or scanned or copied. Information about users interactions and actions pertaining to items in the system is recorded and available for use.

The repository may be any type of memory or storage for items. For example, the repository may be the local memory in a printer or the repository may be a networked memory located on an intranet or the Internet. Multiple memories or repositories may be used. Various types of devices may be used, including printers, facsimile machines, scanners, copiers and multi-function devices. Various types of knowledge management services may be provided including document related services and recommender services.

When the knowledge service is a recommendation service, for each item requested to be recorded the recommendation service stores an implicit rating for the requested item, determines whether, based on the implicit rating and the recommendation criteria, to generate an item recommendation, and if the criteria for generating a recommendation is met, generates a recommendation of a new item. The device then generates a cover sheet for the recorded item and records the recommendation of the new item on the cover sheet.

When the knowledge management service is a workgroup process, it enables users to track office projects. For example, if a user prints a letter for mailing to a customer, the resulting cover sheet can be used as an input sheet to process the answer from the customer, to instruct some workflow support system that the letter was sent and a reply received and so on.

A knowledge management system according to the invention uses print cover sheets to connect users to knowledge relevant both to the user and the communities to which they belong by making use of the declaration of relevance implicit in the print (recording) process. The knowledge management system of the invention enables the cover sheet to become an input, output and surrogate document mechanism providing access to recommender services, document repositories and associated knowledge management services. The knowledge management system of the invention offers users new services which enable users to better manage and to share the knowledge embodied in recorded documents, both at the personal and at the community level.

Choosing to print a document (or record a document on a hardcopy medium) makes an implicit declaration that the document has some relevance or importance to the person doing the printing (or recording). This declaration is preliminary; reading the document may either result in an increased evaluation or its disposal. The fact that one user in a work group printed a document means there is a possibility the document is also relevant or important to other people in the work group or community. Someone else in the group may have printed the document before. It might be useful to the user to know who else in the group recorded the document and perhaps have their opinion of the document. Or, someone else in the work group or community may have printed a similar document; it could be useful to read these additional documents or to know who printed them.

In one embodiment of the invention, a copy of each recorded item may be stored in the repository. By storing the recorded items in the repository, the system creates a workgroup memory of relevant items from which additional knowledge management services may be provided. The system may be used for indexing for searching and fast retrieval. A contextual memory can be used to support the search (e.g., "I remember I printed that document last week."). The system can be used for retrieval of related documents (the "friends" of the document) along with the names (if they are provided) of which users printed the documents. This supports an awareness of related activities and facilitates locating experts. The system can be used to cluster and categorize documents to support self-awareness of activities and shifts in individual and group interests. The system can be used to recognize multiple versions of the same document and can alert users to earlier readers or authors when a more recent version of a document is recorded.

When the knowledge management system of the invention is associated with a recommender service, the output cover sheet provides one or more recommendations generated by the recommender service. These recommendations are based on predetermined criteria and are typically other documents that have been printed or recorded by others in the work group. In addition to printing one or more recommendations of other documents printed or recorded by others in the work, the output cover sheet may be printed with the user's work group name and some identifier for the document. The recommendation criteria used by the recommendation service can be based on similarity among documents, defined user profiles and preferences or such other criteria as the work group or community specifies. In addition to generating recommendations based on implicit ratings generated in the work group, the recommender service can generate recommendations based on whatever explicit ratings are input into the system. Explicit ratings may be input into the system by using the printer output cover sheet as a Paper UI input cover sheet.

The output cover sheet usually has a lot of free space which can be used as an input field for requesting services from the knowledge management service, for providing user comments or explicit ratings or as a convenient output space for printing other information, for example about the document or the work group. The additional space on the cover sheet enables the cover sheet to be used an input mechanism to other Paper UI systems or to the knowledge management system. The cover sheet may include, for example, checkboxes for selecting predefined services from the knowledge management service, such as storing a copy of the printed document in memory, archiving the document permanently, making the document public, erasing the document from memory, classifying the document, providing comments or ratings to a recommender service.

In the case of a recommender system, if the user writes in an explicit recommendation on the cover sheet and the cover sheet is scanned into the system, the recommender service stores the explicit recommendation for that document and uses it in future recommendation calculations. For documents made public this information, together with any possible annotation, inputs recommender engines such the Knowledge Pump and enables the identification and classification of printed documents in a variety of storage systems. This enables a user to easily rate their printed documents to hold a quantitative measure of its value. If the cover sheet is used as an input mechanism to a Paper UI system, it may be used, for example, to issue permanent storage instructions, together with personal notes about the document content to document repositories.

To assist in filing or storing the cover sheet, the cover sheet may be used as an output mechanism that provides other document characteristics, or metadata, such as author (s), sources, etc. for the document; to provide lists of similar documents available in the document repository or in a network of connected community repositories, and to provide a list of comments and evaluations left by other people to the same document.

When a document is selected for recording by a user, the system outputs a cover sheet including the user's name, an identifier for the document and an associated knowledge management service (such as a recommendation from the recommender service). Other information may also be recorded on the document such that the cover sheet can be used in connection with a Paper UI system, i.e., as an input cover sheet to the Paper UI system. For example, in a Paper U/I system such as FlowPort® provided by Xerox Corporation, the cover sheet can be used as a surrogate for the document, i.e., the electronic version of the document which is stored in a document repository associated with the Paper UI system. In establishing a permanent link between the cover sheet and a document in a repository, the cover sheet becomes a personal document surrogate for the user, who can then act on it or require other services regarding this document (latest version, etc).

The device for recording an item on a hardcopy medium may be a multi-function device (MFD), a device which is a digital that can scan, store the scanned item in memory and print the scanned item. When an item is presented for printing to a MFD, the MFD can store an image of the item printed. This image can be stored locally in the MFD's memory, in the recommender services memory or in a document repository. If stored in a document repository, the document repository may be located locally or remotely and accessible by a network. Storing a record or image of each item printed or recorded enables the knowledge management system to retain a history of items implicitly of interest to the work group. It also enables users to access the stored items. This may be especially advantageous if a transitory item such as a Web page downloaded from the Internet is printed.

DETAILED DESCRIPTION OF THE PREFERRED EMBODIMENTS

Figure 1:
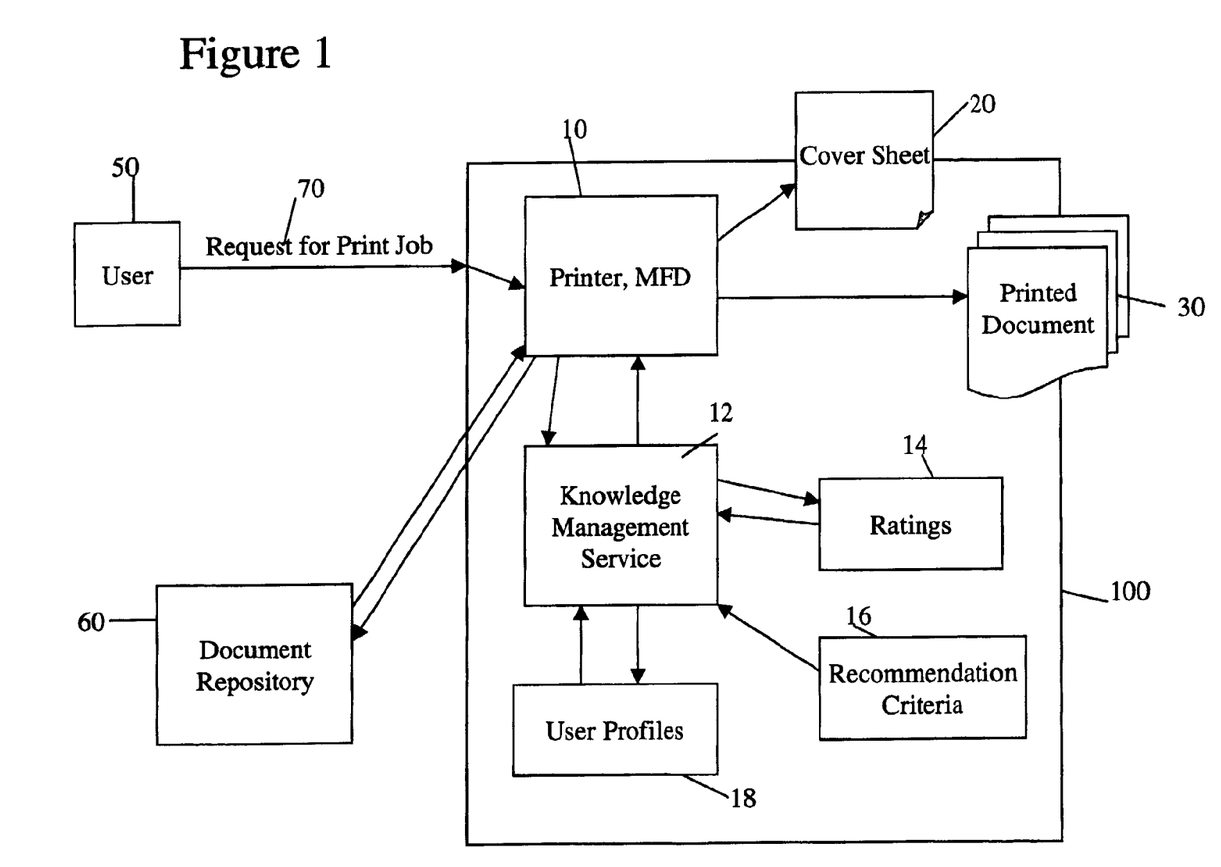
FIG. 1 is a block diagram of a knowledge management system according to the invention.

Referring to the drawings and in particular to FIG. 1, a knowledge management system 100 according to the invention is shown. Knowledge management system 100 includes device 10 for recording an item or document on a hardcopy medium, which may be a printer, multi-function device, copier or scanner. In most work groups, the device 10 will be a printer. In response to a request from user 50 to print a document 70, device 10 generates a cover sheet 20 which precedes the printed output document 30. In order to print output job 30, printer 10 may access the electronic version of the document 70 from a document repository 60. Document repository 60 may be located locally or on a network. In some cases, the user 50 will send the electronic version of the document 70 to be printed directly to device 10.

If device 10 is a MFD, device 10 can generate and store an image of the item printed. This image can be stored locally in the MFD's memory, in the knowledge management services 12 memory or in the document repository 60. Storing an image of all documents printed by device 10 enables users to search the stored images and print out documents that may be recommended by a recommender service or otherwise employ knowledge management services 12 associated with the requested document 70.

System 100 also includes knowledge management services 12. Knowledge management services 12 may be any document related service. If knowledge management service 12 is a recommender service, in response to the user request recommender services 12 stores an implicit rating of the requested document 70 in ratings 14. If the user 50 has a particular user profile stored in the user profiles 18 on the system 100, the recommender services 12 updates the user 50's profile to indicate a positive rating of the requested document 70. Recommender service 12 analyzes document 70 using some predefined recommendation criteria 16 in order to generate a recommendation to user 50. User profiles 18, ratings 14 and recommendation criteria 16 may located locally with the recommender services 12 and facilitated by a memory and database, for example. One or more of user profiles 18, ratings 14 and recommendation criteria 16 may also be located externally on a network or in the document repository 60. Document repository 60 may be a database in memory.

Many different types of recommendation criteria may be used to generate a recommendation. Some of these techniques are described in copending, coassigned U.S. patent application D/A0034, which is incorporated herein by reference. For example, the recommendation criteria can be based on determining document-document similarities, document-user similarities and user-user similarities.

If document-document similarities are determined, the recommender service 12 may generate a recommendation based on other similar documents rated in the system. Documents may be clustered on the basis of their similarity (using linguistic tools) for example. If document-user similarities are determined, the recommender service 12 may generate a recommendation based on other documents according to the user's profile specified preferences. If user-user similarities are determined, the recommender service 12 may generate a recommendation based on what other users have preferred. Correlations among people on the basis of how much they tend to print similar documents may be determined, for example. Combinations of these three techniques can also be used to generate a recommendation as well as to generate multiple recommendations.

Figure 4:
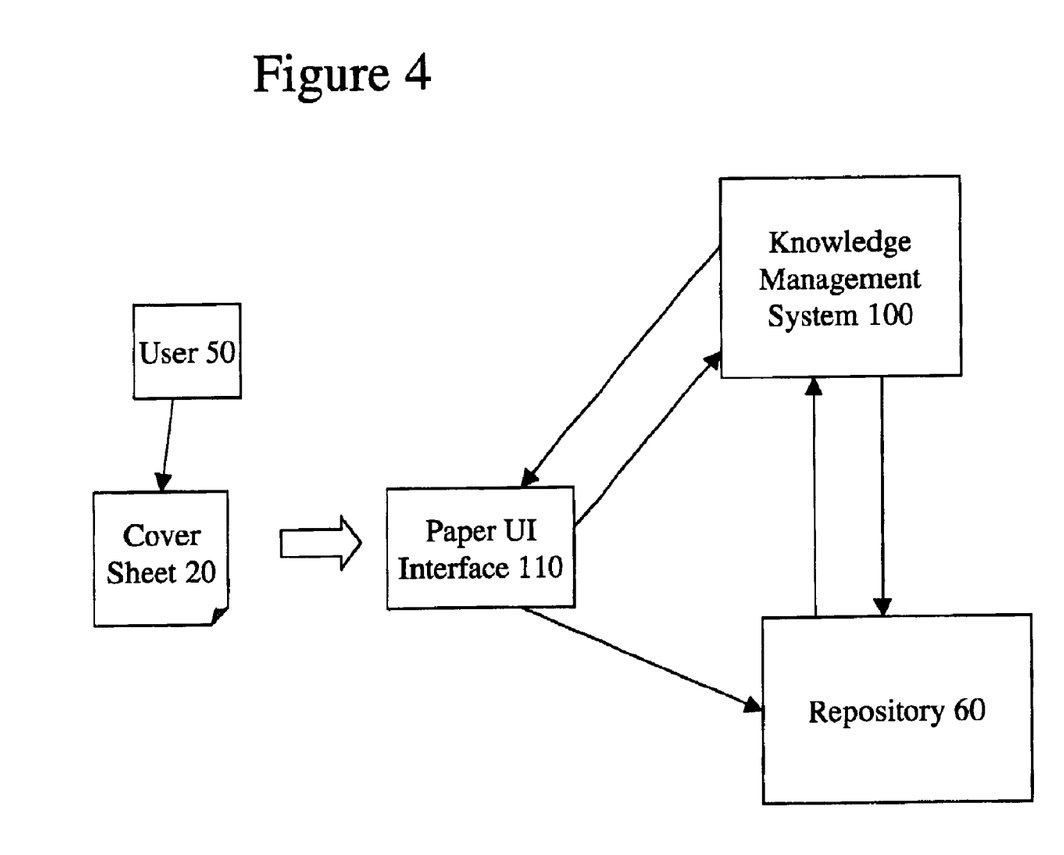
FIG. 4 is a block diagram of a knowledge management system coupled with a Paper UI system.

The knowledge management system 100 improves the print (or recording) process in several ways. If knowledge management system 100 is connected to a document repository 60, an electronic version of the printed documents 30 may be automatically stored, either as content or as pointers. The cover sheet 20 becomes a permanent link between the printed document 30 and its electronic counterpart 70 in the repository 60. The cover sheet 20 may be used as an input/output device for knowledge management services connected with the document, such as through a Paper UI interface 110 (such as FlowPort) as seen in FIG. 4. The cover sheet thus becomes an input, output and surrogate document mechanism enabling access to both document repositories and associated knowledge management functionality (Paper UI—FlowPort).

If the print process is connected to a document repository 60 associated with system 100, the system 100 may store in the repository 60 an electronic record of all the documents going through it. In this way a memory of all printed documents is dynamically constructed providing both personal and community wide benefits: From the user's perspective, the repository becomes an alternative place to look for printed documents which are frequently difficult to find in either their physical or even electronic form. This is helpful for Web documents, often found on the Internet, which were printed because they seem interesting, but were not archived in a personal or common area. Sometimes a user has only a vague memory that something useful on a topic was printed some time before from the Internet. Even if the user may remember the URL for the document, the document may no longer be there. The print repository 60 is then a convenient place to browse and eventually reprint it.

From a community perspective, the print repository 60 may be an image of what a community considers important enough to be printed; it is therefore useful to store current and past interests expressed in this way. The information contained in the repository can be used to assist recommender services 12, exploiting the implicit declaration of interest made when printing documents (without requiring additional effort to the users).

The community knowledge management system may offer network access for the user, for example from a Web browser, and is possibly hosted by the device 10. The user may access the knowledge management functions directly from a paper based interface as in a Paper UI system 110. By marking and then scanning in the cover sheet 20, the user can require the archiving/disposal of the document, or control its visibility (private/public, or access control list).

Paper UI systems such as FlowPort use machine readable markings on the cover sheets to tell the electronic information system what kind of paper document is being read. For example, a Paper UI cover sheet will include a mark such as a DataGlyph which tells the system the sheet is a cover sheet. Other marks tell the system what type of cover sheet. Regions on the cover sheet include machine readable code which tell the system that user input comments may be present.

The system 100 can also provide indexing functions in that the system can produce indexes targeting a single user as well as the community. These indexes can in turn be used to access (or more generally act on) documents, for example by marking a DataGlyph enabled index and scanning it in. A user can define a user index which he/she can use as a personal tool to manage personal documents. For instance the repository can produce a weekly index of new documents, or the user can have a physical folder containing the coversheet of her/his documents that is kept indexed by a paper index produced by the repository.

The cover sheet 20 is dynamically generated each time a user submits a request to record a document. The cover sheet 20 may include various information in addition to the user name, document name and associated knowledge management service. For example, the cover sheet 20 may include checkboxes for selecting defined services (to enable the cover sheet to become an input sheet to the system 100 or some other paper UI system, a thumbnail of the document printed, a space for private notes (to be handwritten or to be printed from memory), document metadata (author, creation date, etc.) and access control (to make the document private or public).

Figure 2:
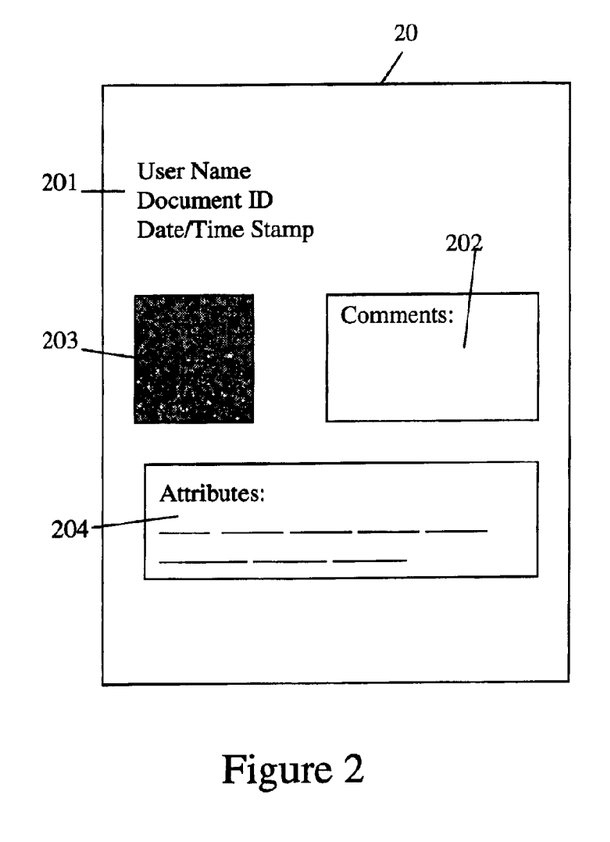
FIG. 2 is a diagram of the front page of a cover sheet generated by the knowledge management system of FIG. 1.

Referring to FIG. 2, the front side of a cover sheet 20 is shown. This particular cover sheet is intended to be used also as a cover sheet for a Paper UI system such as FlowPort. Device 10 prints the user name, document ID and a data/time stamp in region 201. Region 202 is a blank area in which the user can write in comments. When scanned into a Paper UI system, the system knows to send the information scanned in this region to an optical character recognition routine to decode the user comments. In this example, the comments are designated to be miscellaneous comments for use by the user in describing the document.

The cover sheet 20 may also become a permanent link with the printed document 30. By assigning a unique identifier and encoding it on the cover sheet 20, the cover sheet 20 becomes a document surrogate for the printed document 30. To assist the user in identifying the document to which the cover sheet 20 is surrogate, a thumbnail image 203 of the recorded document may be recorded on cover sheet 20. These features are described further in U.S. Pat. No. 5,682,540, System for representing electronic files using a paper medium, the cover sheet ('540 patent). With this functionality, every time a document is printed a cover sheet is produced holding a thumbnail representation 203 and some information about the document itself (e.g., title, length, authors, and miniature of the first page) in region 204. This cover sheet 20 can then be filed, used to further retrieve the document, to store personal notes and also shared with other users as stated for the document surrogates.

Since the Paper UI system 110 is linked with the knowledge management system 100, the cover sheet 20 becomes more than a surrogate document as contemplated by the '540 patent. The surrogate is linked not only to the original document, but also to relevant information that can dynamically change, such as a list of similar relevant documents contained in the repository, a history of recommendations generated by recommender service 12, or the list of the notes left by other readers. The creation of the permanent link between the cover sheet and the document 70 in the repository is done by default according to what specified in a user profile, e.g., a user could set to always have the documents stored in the repository. Modifications of the default behavior are still possible and are done through the cover sheet by using the cover sheet as the input to the Paper UI portion of the system.

The cover sheet 20 thus becomes an input/output device for various knowledge management services connected with the document. An important feature of the cover sheet is that the cover sheet is not only useful to manage the document, but it also an entry point to relevant knowledge connected to the document and this information could be stored either in the print repository associated with system 100 or with other heterogeneous repositories or both. For example, the user can query the system about the latest version of the document, or the latest set of related documents or of comments, via the cover sheet.

Users may wish to control the privacy of the data that is printed on the cover sheet 20. Users may control the data printed on the cover sheet by setting forth criteria in their user profile, for example. Alternatively, sensitive data may be printed on reverse side of the cover sheet. If the cover sheet is printed face up (see FIG. 2), all information on the face side is available to the public in the work group. Information printed on the reverse side (see FIG. 3) is not generally seen and users may select this side to print other potentially interesting information to the user.

In a work group there may be more than one printer. The user may control data output by selecting a printer which is not coupled to the knowledge management service. But by choosing the "smart" cover sheet enabled logical printer, the user declares explicitly to be in "work mode". However it should also be noted that since the environment is a workgroup with a shared print room, the expected level of privacy is already low.

One property of the cover sheet is that it is a long-lived entry point to knowledge management functions related to the document via a Paper UI interface. Identifying the user or the user who makes a particular comment or recommendation is sometimes important information in the system. Some users may wish to be kept anonymous for some or all of the knowledge management functions. These management functions may be coded in the cover sheet (e.g., new versions, new related documents) and are therefore potentially usable by different users. Therefore, identifying the user when he or she uses the cover sheet to instruct an input request to the system is important both to control access to these functions, and to help the system to tune the answer to the identity of the person who is using the coversheet.

Figure 3:
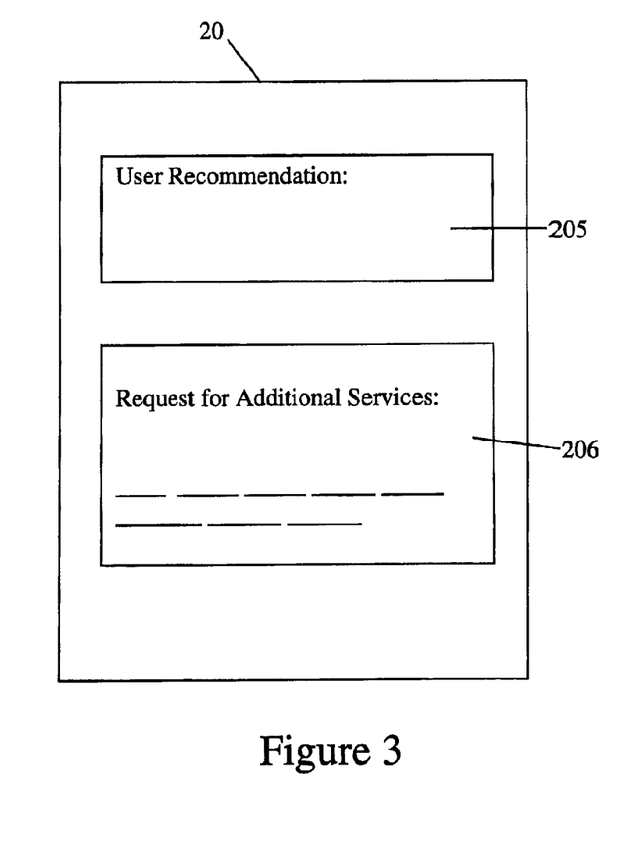
FIG. 3 is a diagram of the reverse page of the cover sheet of FIG. 2.

A feature of the cover sheet is that it may be used to input explicit ratings and free text notes to the recommendation services. In this embodiment, the user input field for recommendation or explicit ratings or comments or notes is region 205 in FIG. 3. FIG. 3 shows the reverse side of cover sheet 20. The user enters a recommendation or comment or note in region 205 either in free hand or by selecting predefined categories (not shown, such as "rate this document 1–5"). The user then inputs the cover sheet to a Paper UI input device which may be a separate scanner or the scanner function of device 10 if device 10 is a MFD.

The cover sheet 20 provides a recommendation to the user in context when the document is printed and later the user may enter an explicit rating or recommendation by scanning it into the system. This coupling leverages the observation that printed documents are likely of wider interest and allows the user to make the recommendation when a better judgment has been formed. Or the recommendation could be used in a second stage (after having read the document) when using the cover sheet for other document personal management (e.g., deletion/validation of storage, storage of personal notes). Given that recommender system usually provide large classification schema (communities of interest) where to submit the document, the cover sheet can be augmented with user interface stickers to specify application specific additional commands non available on the cover sheet, such as a complete list of communities of interest available. These stickers could be available at the MFD.

The cover sheet can also be used to learn whether similar documents are available, both in local or distributed repositories. For this purpose the cover sheet can be used in the Paper UI input context to select application of various information retrieval tools to point to relevant similar documents which other people in the community printed. This information may also identify if some other people are experts or at least interested in the area covered by the document. The search for similar documents can be expanded as well to a network of repositories, and the search can be expanded by using additional keyword to tune it. Also in this case the benefit of having the function available on the cover sheet, derives from the possibility to issue the search at the same moment the printed document is retrieved.

The set of functionality of the cover sheet is such that each user, though the user profile, can have different wishes about what to have done by the system automatically and what through an additional interaction with the cover sheet. Some functions which may be user set include functions such as automatic storage/deletion in the repository, automatic search for similar documents in the local repository/in a set of repositories, and automatic selection of comments from other members of the communities.

For automatic storage/deletion in the repository several possible policies may be employed. Printing a document may involve storing the representation of the printed document in the repository for a given period (for example, two weeks), after which it is automatically deleted, unless a user explicitly asked for a longer storage. Printing a document may involve storing it until all concerned users have asked for its disposal. Variations are possible because a document can by default be kept private by a user, or made public.

The knowledge management system of the invention provides a cover sheet which becomes an input, output and surrogate document mechanism enabling access to both document repositories and associated knowledge management services.

When the cover sheet is used as an input mechanism to various Paper UI applications, it issues permanent storage instructions, together with personal notes about document content to document repositories; enables a user to easily rate their printed documents to hold a quantitative measure of its value. For documents made public this information, together with any possible annotation, inputs recommender engines such the Knowledge Pump and enables the identification and classification of printed documents in a variety of storage systems.

When the cover sheet is used as an output mechanism from applications, it maintains document characteristics, or metadata, for example author(s), sources, etc, provides lists of similar documents available in the document repository or in a network of connected community repositories via recommendations and provides a list of comments and evaluations left by other people to the same document.

In establishing a permanent link between the cover sheet and a document in a repository, the cover sheet may becomes a personal document surrogate for the user, who can then act on it or require other services regarding this document (latest version, etc).

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A knowledge management system, comprising:
   a knowledge management service for providing services associated with items in the system;
   a repository for storing electronic versions of items in the system;

a device, responsive to a user request, for recording a requested item on a hardcopy medium, wherein for each item requested to be recorded the device generates a cover sheet, wherein the cover sheet comprises a hardcopy medium having human readable marks identifying the requesting user, the item recorded and the knowledge management service associated with the requested item;

wherein, responsive to the user request, the knowledge management service stores a record of the user request with an electronic version of the requested item in the repository.

2. The knowledge management system of claim 1, wherein the device comprises a printer.

3. The knowledge management system of claim 2, wherein the item comprises a document having associated metadata, and wherein the device records the document's metadata on the cover sheet.

4. The knowledge management system of claim 3, wherein the metadata comprises document characteristics including author, date of creation, sources, document format type.

5. The knowledge management system of claim 1, wherein the cover sheet includes a region containing machine readable code for enabling the cover sheet to be used as an input media to the system.

6. The knowledge management system of claim 5, wherein the cover sheet further includes a region for receiving machine readable, user imparted or modifiable marks.

7. The knowledge management system of claim 6, wherein the user imparted marks comprise user comments pertaining to the item.

8. The knowledge management system of claim 1, wherein the knowledge management service comprises a recommender service for storing ratings of items and for generating recommendations for new items based on recommendation criteria;

wherein, responsive to the user request, the recommendation service stores an implicit rating for the requested item, determines whether, based on the implicit rating and the recommendation criteria, to generate an item recommendation, and if the criteria for generating a recommendation is met, generates a recommendation of a new item; and wherein, responsive to the recommendation service, the device records the recommendation of the new item on the cover sheet.

9. The knowledge management system of claim 8, further comprising a device for reading a hardcopy medium having machine readable and human readable marks thereon;

wherein, responsive to a cover sheet having machine readable and human readable marks having been read, the recommendation service determines whether an explicit rating of a recorded item has been read, and if so the recommendation service stores an explicit rating for the recorded item.

10. The knowledge management system of claim 8, wherein the recommender service further stores user profiles for use in generating recommendations.

11. The knowledge management system of claim 1, wherein the device, responsive to the user request, stores an electronic representation of the recorded item in the repository.

12. The knowledge management system of claim 1, wherein the cover sheet further includes machine readable code identifying the recorded item in electronic form in the repository.

13. The knowledge management system of claim 1, wherein the device comprises a multi-function device for printing, scanning and copying items.

14. A method for managing information, comprising:
providing a user request for recording an item on a hardcopy medium;
storing a record of the user request with an electronic version of the requested item in a repository for storing electronic versions of items;
associating a service with the requested item; and
generating a cover sheet comprising recording human readable marks identifying the requesting user, the item recorded and the knowledge management service associated with the requested item on a hardcopy medium.

15. The method of claim 14, wherein the item comprises a document having associated metadata, and further comprising recording the document's metadata on the cover sheet.

16. The method of claim 15, wherein the metadata comprises document characteristics including author, date of creation, sources, document format type.

17. The method of claim 14, wherein the cover sheet includes a region containing machine readable code for enabling the cover sheet to be used as an input media to the system.

18. The method of claim 17, wherein the cover sheet further includes a region for receiving machine readable, user imparted or modifiable marks.

19. A method for generating recommendations, comprising:
providing a user request for recording an item on a hardcopy medium;
storing an implicit rating of the requested item in a recommendation service for storing ratings of items and for generating recommendations for new items based on recommendation criteria;
determining whether, based on the implicit rating and recommendation criteria, to generate an item recommendation;
if the criteria for generating a recommendation is met, generating a recommendation of a new item; and
generating a cover sheet, wherein the cover sheet comprises a hardcopy medium having human readable marks identifying the requesting user, the requested item and the recommendation of the new item.

20. The method of claim 19, wherein the recommendation service further stores user profiles for use in generating recommendations.

21. The method of claim 20, further comprising the step of storing an electronic representation of the recorded item in a document repository.

22. A cover sheet for use in a knowledge management system including a recommendation service for storing ratings of items and for generating recommendations for new items based on recommendation criteria and a device for recording items on a hardcopy medium, comprising:
a hardcopy medium having human readable marks recorded on the hardcopy medium by the device, the human readable marks including:
human readable marks identifying an initial user requesting an item to be recorded on a hardcopy medium and the item recorded; and
human readable marks comprising a recommendation of a new item, wherein the recommendation service, responsive to the initial user request for recording an item on a hardcopy medium, stores an implicit rating for the requested item, determines whether, based on the implicit rating and the recommendation criteria, to generate an item recommendation, and if the criteria for generating a recommendation is met, generates a recommendation of the new item; and the hardcopy medium further having a region for receiving machine readable, user imparted or modifiable marks, wherein, responsive to the region having been read and user imparted marks having been found, the recommendation service determines whether an explicit rating of a recorded item has been read, and if so the recommendation service stores an explicit rating for the recorded item.

23. A cover sheet for use in a knowledge management system including a knowledge management service for providing services associated with items in a system, comprising:

a hardcopy medium having human readable marks recorded on the hardcopy medium by the device, the human readable marks including:

human readable marks identifying an initial user requesting an item to be recorded on a hardcopy medium and the item recorded; and human readable marks comprising a knowledge management service associated with the requested item, wherein the knowledge management service, responsive to the initial user request for recording an item on a hardcopy medium, stores a record of the user request with an electronic version of the requested item in a repository;

the hardcopy medium further having a region containing machine readable code for enabling the cover sheet to be used as an input media to the system.

* * * * *